Patented Nov. 9, 1943

2,334,051

UNITED STATES PATENT OFFICE 2,334,051

TREATMENT OF DRILLING FLUIDS

Truman B. Wayne, Houston, Tex.

No Drawing. Application August 31, 1939,
Serial No. 292,887

10 Claims. (Cl. 252—8.5)

This invention relates to mud-laden or drilling fluids and particularly to the treatment of drilling fluids used in rotary drilling for petroleum, natural gas, and sulfur. This application, as to common subject matter, is a continuation-in-part of my application, Serial No. 164,528, filed September 18, 1937, issued October 8, 1940, as U. S. Patent 2,216,865.

The fluid employed for rotary drilling operations may be made from the natural clay which occurs at the location or may be synthetically compounded from the clay and mud bases of commerce, including bentonite and beidellite. Such fluids may also contain a heavy substance such as barytes, iron oxide, or the like, for increasing the specific gravity of the fluid.

Such fluids as are synthetically compounded may be controlled as to viscosity by a proper variation of the colloidal content, but when the cuttings from the bore hole become entrained in the fluid, its composition has changed, and further control is often necessary in order to maintain the desired viscosity but at the same time to permit the cuttings to settle out and render the fluid of such character that it will not be susceptible to gas cutting. With fluids which are compounded with the clay at the location, it is obvious that such control is more difficult. Furthermore, it is sometimes desirable to reduce the viscosity of drilling fluids initially.

It is an object of the present invention, generally stated, to provide a process and agent for the treatment or degelling of mud-laden or drilling fluids in order to control the viscosity and thixotropic properties thereof.

Another object of the invention is to provide a process and agent for treating such fluids whereby the properties of the hydrated clay colloids are modified and the viscosity of the fluid reduced.

A further object of the invention is to provide a mud-laden or drilling fluid and the process of making it in which the properties of the colloidal matter in the fluid are substantially modified and rendered suitable for rotary drilling purposes.

A more specific object of this invention is to provide a process and agent for the treatment of mud-laden or drilling fluids from a class of chemical reagents, and a treatment wherein a member of said class of chemical reagents is used, and a drilling fluid which has been suitably modified by said treatment, as will hereinafter be described.

Other objects will become apparent to those skilled in the art when the following description is read.

In accordance with the present invention, generally stated, a mud-laden fluid such as that employed in the rotary drilling of oil wells may be treated with a chemical agent which, upon reaction with certain constituents of the fluid, modifies the colloidal properties of the colloidal matter in the fluid. More specifically, in accordance with the present invention, a degelling action on the mud laden or drilling fluid is produced by a class of chemical substances, dispersible-in-water, which may be generally described as ester-like bodies of resinous or fused nature produced by the reaction of hydroxy organic bodies with an acidic body derived from the class comprising suitable acid-forming oxides of elements preferably selected from group V of the periodic system of elements. This may be accomplished by treatment with chemicals so selected that the reaction which accomplishes the change produces a substantially irreversible reduction in the hydration or hydration capacity of the gelatinous, colloidal fraction of the drilling fluid. This results in a desirable modification of the gel strength and the thixotropic properties, as well as a substantial viscosity reduction. Other benefits such as better wall building, an impervious film on the bore-hole surfaces which prevents water infiltration into the formations, release of occluded gas and the prevention of gas-cutting, are also obtained. This action has been descriptively referred to herein, and in my copending application, Serial No. 164,528, as a "degelling" action.

There are considerable variations in the properties of the acid-forming oxides of the elements comprising group V. Owing to their relative reactivity, cheapness, and availability, ester-like bodies prepared from a hydroxy organic body and the acids, anhydrides, or acid salts of phosphorus, vanadium, and arsenic are preferred. A number of suitable chemical bodies, produced by such reactions are hereinafter enumerated, but it will be understood that other suitable substances are contemplated.

Many of the oxy-acids derived from the acid-forming oxides of elements comprising group V exist in the ortho, meta, and pyro forms, depending upon the degree of hydration of the acidic oxide, or, conversely, on the degree of dehydration if prepared from an ortho acid or salt. In addition to these various forms, it is contemplated that polymeric forms prepared by heating the acids or acid salts are useful in my process. Amorphous "glasses" prepared by fusion and/or dehydration of acid salts are highly suitable for my purpose, provided they still contain reactive groups or bonds which allow them to combine chemically with one or more hydroxyl groups of hydroxy organic bodies. The various polyphosphate fusions are the best known products belonging to this class, but various others derivable from acid arsenate or vanadate complexes are also useful. In the majority of cases it is preferable to prepare these complexes by polymerization of the reaction products prepared from simpler ortho, meta, or pyro acids or acid salts and the hydroxy organic body. However, the poly-derivative of the acid-forming oxide may first be prepared, and then reacted with the hydroxy organic body.

The hydroxy organic body used in preparing my improved reagents may be selected from the group comprising tannins, sugars, starches, cellulose, gums, lignins, humins, hydroxy organic acids of the aliphatic, alicyclic, or aromatic series, hydroxy-anthraquinones, polyhydric alcohols, alkylolamines, and other hydroxy organic bodies capable of undergoing esterification reactions with a reactive derivative of an acidic oxide. Usually the tannins, lignins, and hydroxy aromatic organic acids are preferred for reasons of availability and cost.

In the preparation of my improved reagents, reaction conditions must be chosen which will effect esterification, addition or etherification, or a combination of these reactions, so that chemical combination occurs between the acidic function of the acidic oxide derivative, and the hydroxyl group, amino group, or other combining group of the hydroxy organic body. The term "ester-like" has been used herein to describe the reaction products so produced, regardless of whether chemical combination has been produced solely by esterification, or not. Since polymerization to the higher semi-resinous forms is usually produced when these reactions are conducted above the melting point of the hydroxy organic body, union through the splitting off of water from hydroxyl groups often occurs. This can not be strictly considered as esterification; rather, it is a type of etherification, but since the acidic oxide derivative has acted as an acidic body in its chemical reactions with the hydroxy organic body, the final products are herein described as "ester-like bodies."

The colloidal fractions of bentonite, as well as those of various clays obtained from widely different locations, are quite similar in their composition with respect to silica, alumina, and iron, the main deviation only being from 10 to 15 per cent of the average of each of these substances. The differences in properties exhibited by mud-laden or drilling fluids prepared from clays and clayey materials obtained from various sources are largely due to varying proportions of calcium and/or magnesium present in the colloidal fraction and to the larger proportion of non-colloidal inert material contained in the same clayey suspension. In all cases these gel substances are complex hydrous silicates containing considerable proportions of alumina and, in fact, may be classed either as hydrous alumino-silicates or in some instances hydrous silico-aluminates. Such substances invariably contain appreciable quantities of calcium and/or magnesium in their composition and it has been observed that the corresponding sodium or potassium compound does not possess the same degree of gelatinous properties and the accompanying high viscosity that is associated with the corresponding alkaline-earth bearing hydrous silicates.

In order to illustrate the principles of my invention, a number of specific examples are hereinafter given. However, it should be distinctly understood that I do not confine myself to the specific treating agents, drilling fluid compositions, or proportions hereinafter disclosed, as it should be understood by those skilled in the art that variations from these disclosures do not depart from the principles and spirit of my invention which is directed in a general way to the use of polymerized ester-like bodies of resinous or fused nature in the degelling and controlling of the viscosity of mud-laden or rotary drilling fluids.

The tests described in the following examples were conducted on well drilling fluids prepared largely from Wyoming bentonites and water so as to have a maximum content of the hydrous aluminum silicates which are reacted upon in the manner herein described. Drilling fluids prepared from natural clays and shales usually encountered during drilling operations are similarly acted upon, since in all cases the colloidal fractions of such materials are quite similar in composition and properties to the purer colloidal gel-forming material, bentonite.

Tests were made using this product in the degelling of an 8% aqueous bentonite suspension. In all cases aqueous solutions of the treating agent were added to 200 ml. samples of the drilling fluid in the proportion specified, agitated thoroughly, and tested in a Stormer viscosimeter at 600 R. P. M., and at a temperature of 20–25° C.

EXAMPLE 1

300 parts of anhydrous quebracho extract containing approximately 70% tannins were carefully mixed with 140 parts of phosphorous pentoxide in a rapidly shaken glass vessel equipped with a cooling jacket. The reaction was started by warming slightly, and was then controlled by means of cooling water to prevent decomposition. After the exothermic reaction had ceased, the air was exhausted from the vessel by means of a vacuum pump, and the mass was heated in vacuo to the fusion point. The water vapor formed during fusion was continuously exhausted from the vessel. The temperature was then lowered somewhat, the vacuum broken, and the fused mass poured out to cool to a hard, brittle mass which was fully soluble in water. Results obtained from tests on an 8% Wyoming bentonite suspension are given in Table I.

EXAMPLE 2

20 parts by weight of anhydrous chestnut extract containing approximately 65% tannins were added to 20 parts of melted ammonium imido diphosphoric acid,

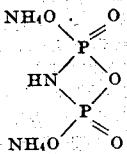

and the mass was stirred vigorously to incorporate the tannin into the molten mass. The mixture was then placed in a vessel and heated at 200° C. in vacuo to melt and fuse the mass to a homogeneous clear melt. The vacuum was used to reduce oxidation of the organic body and to facilitate removal of water formed during the reactions. However, the same reactions could be conducted in an atmosphere of inert gas. Upon cooling, a hard, brittle "glass" was formed which was soluble in water. Results obtained from tests with this product on an 8% Wyoming bentonite suspension are given in Table I.

The exact structure of the above product has not been accurately determined. However, it is known that ammonium imido diphosphoric acid readily condenses to higher forms upon fusion, and in view of its acidic properties and the plurality of reactive groups on the tannin body, a complex of high molecular weight results which is considerably more efficient as a degelling agent than equivalent proportions of either the diphosphoric acid complex or the tannin, or mechanical admixtures of the two substances.

EXAMPLE 3

20 parts by weight of anhydrous mono-ammonium dihydrogen orthophosphate, $NH_4H_2PO_4$, were melted at approximately 300° C. Considerable ammonia was evolved together with water vapor. To the molten fusion product were quickly added 20 parts of anhydrous chestnut tannin extract and the mass was vigorously stirred until it solidified. It was then heated in vacuo to 200° C. to fuse the product into a clear melt, after which it was cooled as a dark-colored, clear, glass. Tests with this product, which greatly resembled the product of Example 2, on 8% Wyoming bentonite suspensions are reported in Table I.

EXAMPLE 4

11.5 parts by weight of $NH_4H_2PO_4$ were melted as described in Example 3, and 15 parts of tartaric acid were rapidly stirred into the molten mass. The mass was then fused in vacuo in the manner previously described. Tests on 8% Wyoming bentonite suspensions are reported in Table I.

EXAMPLE 5

11.5 parts by weight of $NH_4H_2PO_4$ were melted and fused with 9.5 g. of technical gallic acid in the manner previously described. Tests on 8% Wyoming bentonite suspensions are reported in Table I.

EXAMPLE 6

13.5 parts by weight of anhydrous mono-ammonium dihydrogen vanadate were fused in the manner previously described, and 20 parts of anhydrous chestnut extract were added. The mass was heated to the melting and fusion point in a glass retort connected to a vacuum pump for maintaining a vacuum of 29 inches of mercury. The "glass" so formed was used in the treatment of an 8% Wyoming bentonite suspension. Results are reported in Table I.

EXAMPLE 7

15.9 parts by weight of mono-ammonium dihydrogen orthoarsenate were fused and mixed with 20 parts of chestnut tannin extract, and fused in vacuo as previously described. The organic arsenate "glass" was used in the treatment of an 8% Wyoming bentonite suspension. Results are reported in Table I.

Table I

| Material example No. | Grams reagent per 100 ml. of drilling fluid | | | | |
|---|---|---|---|---|---|
| | 0.02 | 0.05 | 0.10 | 0.20 | 0.40 |
| Original fluid (no treatment) | 38 | 38 | 38 | 38 | 38 |
| 1 | 25 | 21 | 17 | 15 | 10 |
| 2 | 27 | 21 | 17 | 15 | 13 |
| 3 | 25 | 21 | 17 | 15 | 13 |
| 4 | 25 | 21 | 17 | 15 | 13 |
| 5 | 25 | 21 | 17 | 15 | 11 |
| 6 | 25 | 21 | 17 | 13 | 11 |
| 7 | 27 | 25 | 21 | 19 | 15 |

The values listed are in centipoises (Stormer).

The similarity in results obtained from the use of organic polyphosphate complexes whose organic radicals were derived from different sources is immediately apparent. This similarity in results, all being a matter of degree, has also been noted as characteristic of the various inorganic polymeric derivatives of polybasic phosphoric acid compounds described in my copending application, Serial No. 163,612, filed September 13, 1937. Evidently, the polyphosphoric acid radical is specific in its action on the gel-forming colloidal bodies in well-drilling fluids, whether in strictly inorganic form or in organic combinations. The latter, however, as exemplified in the present application, represent an improvement in the art due to their somewhat higher effectiveness as degelling agents.

A particular advantage of the ester-like treating agents herein disclosed is their stability in drilling muds which have acquired high temperatures when circulated in the bore hole. Temperatures considerably above the boiling point have been recorded in certain instances. When using the strictly inorganic polyphosphates under such conditions, reversion to the ortho forms may occur to a considerable degree, and this often results in an undesirable increase in the viscosity of the drilling fluids under the temperature conditions above described. These organic phosphates resist these changes and maintain their efficiencies for much longer periods at elevated temperatures.

The organic vanadates and arsenates, likewise derivatives of acidic oxides and an organic hydroxy body, are also of value for this purpose, as it is shown in Table I.

While in the preceding examples either the highly reactive acids or anhydrides, or the more easily fusible ammonium derivatives of acidic oxides have been used to facilitate preparation of these ester-like bodies at temperatures low enough to prevent substantial decomposition and carbonizing of the hydroxy organic body, it will be understood by those skilled in the art that other acidic oxide derivatives of higher melting and fusion points, such as the corresponding alkali-metal salts are also contemplated. Also that other hydroxy organic bodies with higher melting and/or decomposition points are also contemplated, especially when the inorganic material possesses a higher melting point. However, for convenient preparation of suitable ester-like products I prefer the acidic oxide derivatives which may be reacted at lower temperatures with a wide variety of hydroxy organic bodies whose melting or boiling points range between 140–260° C.

It should also be understood that the fusion method of preparation above described represents only one convenient and practicable method of preparing such products. They may also be prepared by reactions in solution or in the presence of an inert vehicle or medium wherein the reacting materials are brought into contact. Various methods of conducting such reactions are known to the skilled organic chemist, and the method of preparation is immaterial. The preceding description relating to preparation of these ester-like organic bodies is purely illustrative.

The above described products may be used alone in the degelling of drilling muds, or may be used in connection with lyophile colloids, buffer substances, alkalies, phosphates, borates, or other substances now in use for this purpose.

The preceding examples exemplify the use of my improved degelling agents on a normal mud-laden drilling fluid prepared in the usual manner from natural or synthetic mud-making materials. The relatively small proportions disclosed are normally sufficient to obtain a satisfactory treatment. However, if it is desired to add larger quantities of gel-forming materials such as bentonite, it is also necessary to use larger proportions of the treating agent, usually from 0.5 to 2.5 per cent, or even higher, based on the weight of the drilling fluid. The excess of treating agent reduces the gel-forming properties of the excess bentonite or other material added, and thus allows larger proportions of gel-forming material to water than normally can be incorporated in the drilling fluid. For instance, wherein a normal 8 per cent suspension of bentonite in water may have a viscosity of 38 centipoises in the Stormer viscosimeter at 600 R. P. M., if the drilling fluid contains as much as 2 per cent of the treating agent, very much larger quantities of bentonite may be incorporated without unduly increasing the viscosity. In fact, fluid muds may thus be prepared from bentonite which approximate the solids composition of muds prepared from natural sources.

It is likewise obvious that muds which have become contaminated with cement, calcareous shales, and/or other sources of polyvalent metal compounds which have produced abnormal viscosities, will require heavier treatment with my improved treating agent to produce normal viscosities for muds so contaminated.

While in the foregoing, theories are advanced, these are put forward to facilitate the understanding of the objects and purposes of this invention; it is to be understood, however, that this invention is not dependent upon or limited to any theory put forward.

What is claimed is:

1. The process of reducing and controlling the gelation and viscosity characteristics of an aqueous mud-laden well-drilling fluid comprising adding thereto a small percentage of a dispersible-in-water compound, which compound is the condensation product resulting from the condensation of a hydroxy organic body and a substance selected from the group consisting of the acidic oxides and acidic oxide derivatives of the elements of group V of the periodic table.

2. The process of reducing and controlling the gelation and viscosity characteristics of an aqueous mud-laden well-drilling fluid comprising adding thereto a small percentage of a dispersible-in-water fusion product, which product is the condensation product resulting from the fusion and condensation of a hydroxy organic body and a substance selected from the group consisting of the acidic oxides and acidic oxide derivatives of the elements of group V of the periodic table.

3. The process of reducing and controlling the gelation and viscosity characteristics of an aqueous mud-laden well-drilling fluid comprising adding thereto a small percentage of a dispersible-in-water polymerized fusion product, which product is the condensation product resulting from the fusion and condensation of a hydroxy organic body and a substance selected from the group consisting of the acidic oxides and acidic oxide derivatives of the elements of group V of the periodic table.

4. An aqueous mud-laden well-drilling fluid containing a relatively small percentage of a dispersible-in-water fusion product, which product is the product resulting from the fusion and condensation of a hydroxy organic body and a substance selected from the group consisting of the acidic oxides and acidic oxide derivatives of the elements of group V of the periodic table.

5. An aqueous mud-laden well-drilling fluid containing a relatively small percentage of a dispersible-in-water polymerized fusion product, which product is the condensation product resulting from the condensation of a hydroxy organic body and a substance selected from the group consisting of the acidic oxides and acidic oxide derivatives of the elements of group V of the periodic table.

6. An aqueous mud-laden well-drilling fluid containing a relatively small percentage of a dispersible-in-water compound, which compound is the condensation product resulting from the condensation of a hydroxy organic body and a substance selected from the group consisting of the acidic oxides and acidic oxide derivatives of the elements of group V of the periodic table.

7. The process for treating an aqueous mud-laden well-drilling fluid comprising adding thereto a small percentage of a dispersible-in-water compound, which compound is the condensation product resulting from at least one type of condensation reaction selected from the group consisting of esterification, etherification, polymerization and combinations thereof, involving a hydroxy organic body and a substance selected from the group consisting of the acidic oxides and acidic oxide derivatives of the elements of group V of the periodic table.

8. The process for treating an aqueous mud-laden well-drilling fluid comprising adding thereto a small percentage of a dispersible-in-water compound, which compound is the condensation product resulting from at least one type of condensation reaction selected from the group consisting of esterification, etherification, polymerization and combinations thereof, involving a hydroxy organic body and an acidic compound selected from the group consisting of acid-forming vanadium oxides and acidic derivatives of said oxides.

9. The process of treating an aqueous well-drilling fluid comprising, adding thereto a small percentage of a dispersible-in-water compound, which compound is the condensation product resulting from at least one type of condensation reaction selected from the group consisting of an esterification, etherification, polymerization and combinations thereof, involving an organic hydroxy body and an acidic compound selected from the group consisting of acid-forming arsenic oxides and acidic derivatives of said oxides.

10. The process for treating an aqueous mud-laden well-drilling fluid comprising, adding thereto a small percentage of a dispersible-in-water compound, which compound is the condensation product resulting from at least one type of condensation reaction selected from the group consisting of. an esterification, etherification, polymerization and combinations thereof, involving an organic hydroxy body and an acidic compound selected from the group consisting of acid-forming phosphorus oxides and acidic derivatives of said oxides.

TRUMAN B. WAYNE.